United States Patent
Bawa

(10) Patent No.: US 7,650,398 B2
(45) Date of Patent: Jan. 19, 2010

(54) LIMITED PLUGIN LOAD-UP IN SUPPORT OF DISTRIBUTED NETWORK MANAGEMENT AND SERVICE PROVISIONING SOLUTIONS

(75) Inventor: Satvinder Singh Bawa, Ottawa (CA)

(73) Assignee: Alcatel-Lucent Canada Inc., Kanata, ON (CA)

(*) Notice: Subject to any disclaimer, the term of this patent is extended or adjusted under 35 U.S.C. 154(b) by 1633 days.

(21) Appl. No.: 10/156,228

(22) Filed: May 29, 2002

(65) Prior Publication Data

US 2003/0225869 A1    Dec. 4, 2003

(51) Int. Cl.
*G06F 15/177* (2006.01)
(52) U.S. Cl. .............. 709/223; 709/203; 709/224; 709/221; 455/419; 719/318; 713/340; 370/389
(58) Field of Classification Search .......... 709/203, 709/224, 221, 223; 455/419; 719/318; 713/340; 370/389
See application file for complete search history.

(56) References Cited

U.S. PATENT DOCUMENTS

| | | | | |
|---|---|---|---|---|
| 5,692,208 | A * | 11/1997 | Felcman et al. | 361/679.38 |
| 6,308,205 | B1 * | 10/2001 | Carcerano et al. | 709/221 |
| 6,339,705 | B1 * | 1/2002 | Pehrson | 455/419 |
| 6,738,811 | B1 * | 5/2004 | Liang | 709/224 |
| 6,757,280 | B1 * | 6/2004 | Wilson, Jr. | 370/389 |
| 6,920,637 | B2 * | 7/2005 | Mason et al. | 719/318 |

2002/0012011 A1    1/2002    Petrov et al.

FOREIGN PATENT DOCUMENTS

WO    WO 01 31848 A    5/2001

OTHER PUBLICATIONS

Klemba. K.S. et al., "HP Open View Network Management Architecture", Hewlett-Packard Journal, Hewlett-Packard Co. Palo Alto, US, vol. 41, No. 2, Apr. 1, 1990. pp. 54-59, XP000116174.
Karjoth, G, "The Authorization Service of Tivoli Policy Director", Dec. 10, 2001, pp. 319-328, XP 010584914. Abstract, Chapters 1, 2, Figure 1.

* cited by examiner

*Primary Examiner*—Thanh Tammy Nguyen
(74) *Attorney, Agent, or Firm*—Marks & Clerk

(57) ABSTRACT

An integrated data network management and data service provisioning environment is provided. The integrated environment includes legacy software application code and current software application code each augmented with code portions enabling exchange of information therebetween via an interworking layer as well as support for limited application code load-up and execution. A facility for participation in and interacting with the integrated environment is also provided. A man-machine interface is integrated across different applications which themselves may be executed on different computers to provide a seamless exchange of information. Feature componetized application code is loaded and executed on a need-to-use basis, and unloaded when not used. Advantages are derived from enhanced resource utilization efficiencies in providing network management and service provisioning solutions. The interworking layer also provides for security enforcement across applications participating in the integrated environment.

20 Claims, 8 Drawing Sheets

LIMITED PLUGIN LOAD-UP IN SUPPORT OF DISTRIBUTED NETWORK MANAGEMENT AND SERVICE PROVISIONING SOLUTIONS

FIELD OF THE INVENTION

The invention relates to data network management and data service provisioning environments, and in particular addresses issues related to resource utilization associated with large management and service provisioning software applications providing network management and service provisioning solutions.

BACKGROUND OF THE INVENTION

In the field of data network management and service provisioning, software applications running on, and hardware associated with, computing platforms such as workstations, computers, terminals, etc. are used in combination to provide network management and service provisioning solutions.

FIG. 1 is a schematic diagram showing data network elements participating in a data transport network and data network elements used in an associated data network management and data service provisioning environment.

A data transport network 100 includes data network nodes such as, but not limited to, data switching nodes 102, and interconnecting data transport links 104. The data transport network 100 enables the conveyance of data between data network nodes associated with service providers 110 and data network nodes associated with service users 112. Both service provider 110 and the service user 112 data network nodes are said to be connected to the data transport network 100 via data transport uplinks 106 to enable the conveyance of data therebetween.

Although only data switching nodes 102 are shown in FIG. 1, the invention is not limited thereto; data transport networks may also include a large variety of data network elements (not shown) such as: routers, bridges, Domain Name Service (DNS) servers, firewalls, multiplexers, demultiplexers, etc.

A data connection 120 presented in FIG. 1 is shown to provision a data service during a corresponding data session between a service provider 110 and a service user 112.

An uplink 108 connects a data network Management Local Area Network (MLAN) 130 to the data transport network 100. The MLAN 130 services a network management and service provisioning hub 132 comprising computing platforms such as legacy computer 140, legacy workstation 142, terminal 144, current computer 150, current workstation 152, advanced interface 154, etc.

Computing platforms in existence include: legacy, current, state-of-the-art, etc. Factors considered in the above classification include: age, capabilities, length of operation, costs of operation, current stage of the development cycle, etc. When reference is made herein to a computer, the computer is understood to include at least one processor and optionally a human-machine interface. When reference is made to a terminal, the terminal is understood to include a computer having limited data processing capabilities but typically used for its human-machine interface capabilities.

Ancillary MLAN connected data network nodes enabling network management and service provisioning include but are not limited to a database 134. The management hub 132 may make use of other MLAN connected data network nodes or devices (not shown) such as DNS servers, relational databases, firewalls, etc.

As part of the network management and service provisioning it may be necessary to employ: monitoring equipment, statistics gathering equipment, statistics processing equipment, storage equipment, statistical information storage database, etc. These devices may be connected to the data transport network 100 directly. All of these devices although not shown, can either form an integral part of data network nodes or may exist as distinct data network nodes themselves.

At least one command and control interface including an output display interface and an input interface is necessary for an analyst to view and interact with a current state of at least a portion of a managed data transport network and/or at least a portion of provisioned service.

In the field, new data services are being demanded by market drivers resulting in a constant development thereof. Existing services are being extended. At the same time new data network equipment is being developed. The result is that a large body of software application code for network management and service provisioning has been and is being developed. This body of software application code today is regarded as being categorized into legacy software application code and current software application code.

Legacy software application code typically has been developed and deployed some time ago. Legacy software application code typically was designed for and typically runs on legacy computers, and in some ways is closely related to the state of the art at the time of the development thereof.

Typically the legacy computers running legacy software application code are no longer sold, maintained and/or supported actively. Another important factor regarding legacy software application code relates to original developer personnel who have been assigned to other projects. All these factors compound resulting in increased costs for supporting legacy software application code curtailing further development thereof.

Current software application code is characterized as having been developed rather recently with some features still being developed, fine tuned and maintained. The current software application code is typically engineered to run on current computers that are available on the market, are still actively maintained and supported.

Therefore in providing a network management and service provisioning solution there are a number of features and advantages that must be taken into consideration. Current computers typically have superior capabilities in comparison to legacy computers. Although considered relatively old, legacy computers include special purpose computers. Computer hardware cost is another factor.

FIG. 2 is a schematic diagram of a computer executing application code in managing a data transport network and/or provisioning data services.

The computer, making use of a processor schematically shown at 200, executes 202 a body of application code 204 to obtain 206 a data network state of the data transport network 100. The current state of the data transport network 100 and/or the supported services are displayed 208 on a display interface 210 for analysis by an analyst 212. The analyst 212 uses an input interface 214 such as, but not limited to, a keyboard and a pointing device to specify 216, and cause commands to be issued 218 to data network equipment in the data transport network 100 to effect a change in the state of the data transport network 100.

The computer using processor 200 may, in the process of displaying a current data network state and/or in the process of issuing commands to the data transport network, transact 220 with other data network nodes providing data network management services such as a database 134.

At a typical hub 132, legacy software application code and current software application code is run on legacy and current computers in combination to provide network management and service provisioning solutions. There are various ways of achieving the running of legacy and current software application code in combination.

FIG. 3 is a schematic diagram showing details of a network management and service provisioning environment facilitating the presentation of a current data network state and providing an interaction therewith.

A legacy computer 310 executes 312 legacy software application code 314 and outputs to an interface including a display interface 302 and an input interface 304. A current computer 320 executes 322 current software application code 324 and outputs to the same interface.

In providing a data network management and data service provisioning solution, the simultaneous display of the output generated by the legacy software application code 310 and the current software application code 320 enables a consolidated view of a then current data network state. Running on different computers 310, 320 the legacy 314 and current 324 applications are "not aware" of each other. The data network state is only apparent to the analyst 212 because of the combined output displayed on the common display interface 302. In making reference to application code "not being aware" of other application code, it is understood that the combination of application code does not have facilities for interaction therebetween including a lack of facilities for information exchange.

In providing a data network management and/or a service provisioning solution using a combination of application code, and due to the lack of information exchange facilities between the applications 314 and 324, the analyst 212 is typically required to make repeated information entries in using applications 314, 324. The repeated information entry actions are time consuming and error prone leading to an inefficient provisioning of the solution.

A limited integration can be provided via an operating system associated with the display interface 302. Such information exchange facilities available are limited to text level "cut/copy/paste" functionality as a remedy to repeated multiple entry tasks. Although somewhat helpful, the available information for cut/copy/paste is limited to displayed information which leads to an information exchange having a very shallow scope. Further, these facilities are not adequate, as it is typically the case, when the multiple entries, although pertaining to the same information, do not have the same data entry format (e.g. date/time formats, units of measure, etc.)

A remedy to the lack of awareness includes extending the legacy software application code 314 to include the features of the current software application code. As pointed out above, the legacy software application code 314 may have been developed specifically for the legacy computers 310. In some cases the legacy software application code 314 was designed pushing the legacy computers 310 to their performance limits; therefore extending the legacy software application code 314 to include the new features would severely affect the performance thereof. Typically legacy code is regarded as stable leading to a reluctance to fix that which is not broken. Further, using this approach would not provide a long term solution since new features are demanded on a continuing basis by market drivers.

Another remedy to the lack of awareness includes the re-coding of the legacy software application code 314 to execute on current computers 320. As pointed above, the legacy software application code 314 may have been developed specifically for the legacy computers 310 taking advantage of specific features of the legacy computers 310; the current computers 320 although superior in may ways may not necessarily have the specific features to enable the legacy software application code 314 to efficiently execute 322 thereon. As such, the legacy software application code 314 would need to be reengineered for the current computers 320 at considerable cost. Once again using this approach does not provide a long term solution as computers are under an ongoing development and as new computers become available the re-coding would have to be undertaken again.

The network management and service provisioning solution may be provided such that legacy 314 and current 324 application code is run on the same computer. This arrangement may not always be viable. Legacy computers 310 are typically short on resources although providing unique features; while current computers 320 are typically resource rich at reduced costs and typically featureless. Nevertheless market drivers push for more and more services, and more and more service features while at the same time service providers have a need to reduce operational overheads by reducing box count. In the art, the term "box count" refers to the number of computers used in effecting network management and service provisioning in the hub 132.

Typical network management and service provisioning solutions are provided employing large monolithic systems provisioning all services and service features. Whenever such large monolithic systems are started up, all components provisioning all services and all service features are started up. Starting up all components, including all less frequently used components, results in very high levels of unnecessary resource utilization—further leading to reduced performance and unscalable solutions.

There therefore is a need to provide integration between legacy and current software application code used in combination to provide network management and service provisioning solutions at reduced operational overheads.

SUMMARY OF THE INVENTION

In accordance with an aspect of an exemplary embodiment of the invention, a network management and service provisioning environment is provided. Software application code portions are run in combination on at least one computer. The software application code portions define an interworking layer therebetween. Software application components provisioning a network management and service provisioning solution correspond to respective software application code portions. Each software application component is loadable for execution separate from the corresponding software application code portion. The separate loading of each software application component, from the corresponding application code portions, provides for a reduction in resource utilization in provisioning the network management and service provisioning solution.

In accordance with another aspect of the exemplary embodiment of the invention, the network management and service provisioning environment further comprises a registry exchanging information with the at lest two software application code portions. The registry holds a list of software application components registered to participate in the network management and service provisioning solution.

In accordance with a further aspect of the exemplary embodiment of the invention, the network management and service provisioning environment further comprises a command dispatch server. The command dispatch server selectively issues operating system level run commands to load for execution software application code portions and the software application components. The selective issuing of operating system level run commands reduces resource utilization in provisioning the network management and service provisioning solution.

In accordance with a further aspect of the exemplary embodiment of the invention, the network management and service provisioning environment further comprises a security access server enabling at least one analyst to interact with the network management and service provisioning solution subject to at least one of a scope-of-command and span-of-control.

In accordance with a further aspect of the exemplary embodiment of the invention, a method of provisioning a network management and service provisioning environment is provided. A software application code portion corresponding to an unloaded software application component of a network management and service provisioning solution is loaded for execution. A need for functionality provided by the unloaded software application component is determined. And, the a software application component is loaded for execution. The selective loading of software application components reducing resource utilization in provisioning the network management and service provisioning solution.

In accordance with a further aspect of the exemplary embodiment of the invention, the provisioning method further comprises a step of selectively issuing a run command to effect the loading for execution of at least one of a software application code portion and a software application component.

In accordance with a yet another aspect of the exemplary embodiment of the invention, the provisioning method further comprises a step of selectively unloading a no longer needed software application component reducing resource utilization in provisioning the network management and service provisioning environment.

The advantages are derived from a data network and service management solution integration provisioning the exchange of information between enabling applications via an interworking layer as well as support for limited application code load-up and execution. Different application code may be executed concurrently on different computers and the man-machine interface is integrated to provide a seamless exchange of information. Feature componetized application code is loaded and executed on a need-to-use basis, and unloaded when not used. Advantages are derived from enhanced resource utilization efficiencies in providing network management and service provisioning solutions. The solution integration also provides distributed application launching, secure user authentication and authorization, secure interaction via the man-machine interface including the enforcement of scope-of-command and span-of-control.

BRIEF DESCRIPTION OF THE DRAWINGS

The features and advantages of the invention will become more apparent from the following detailed description of the preferred embodiments with reference to the attached diagrams wherein.

It will be noted that in the attached diagrams like features bear similar labels.

DETAILED DESCRIPTION OF THE EMBODIMENTS

In accordance with an exemplary implementation of the invention, network management and service provisioning functionality is componetized into software applications.

Figure 1:
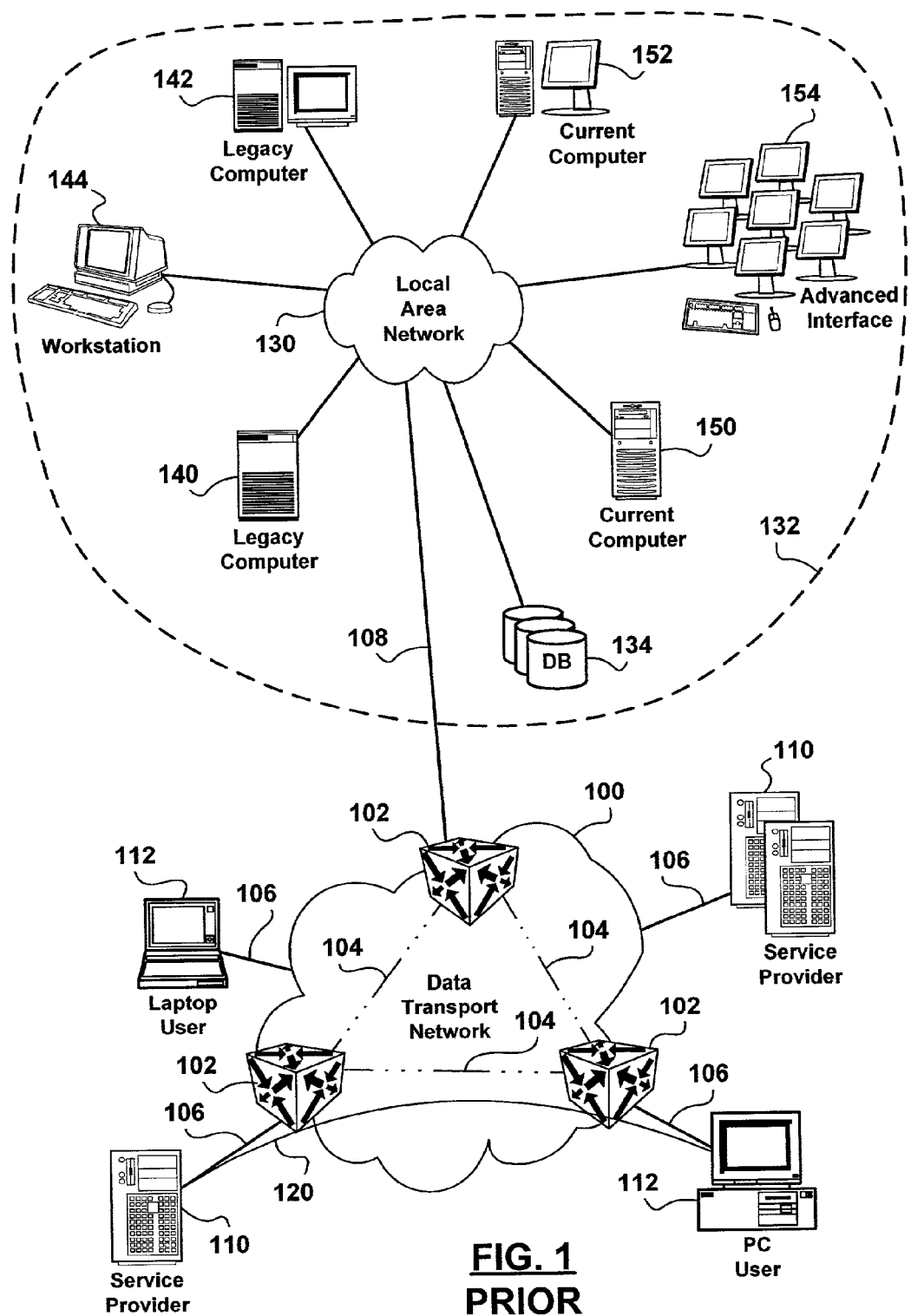
FIG. 1 is a schematic diagram showing data network elements participating in a data transport network and data network elements used in an associated data network management and data service provisioning environment.
Figure 2:
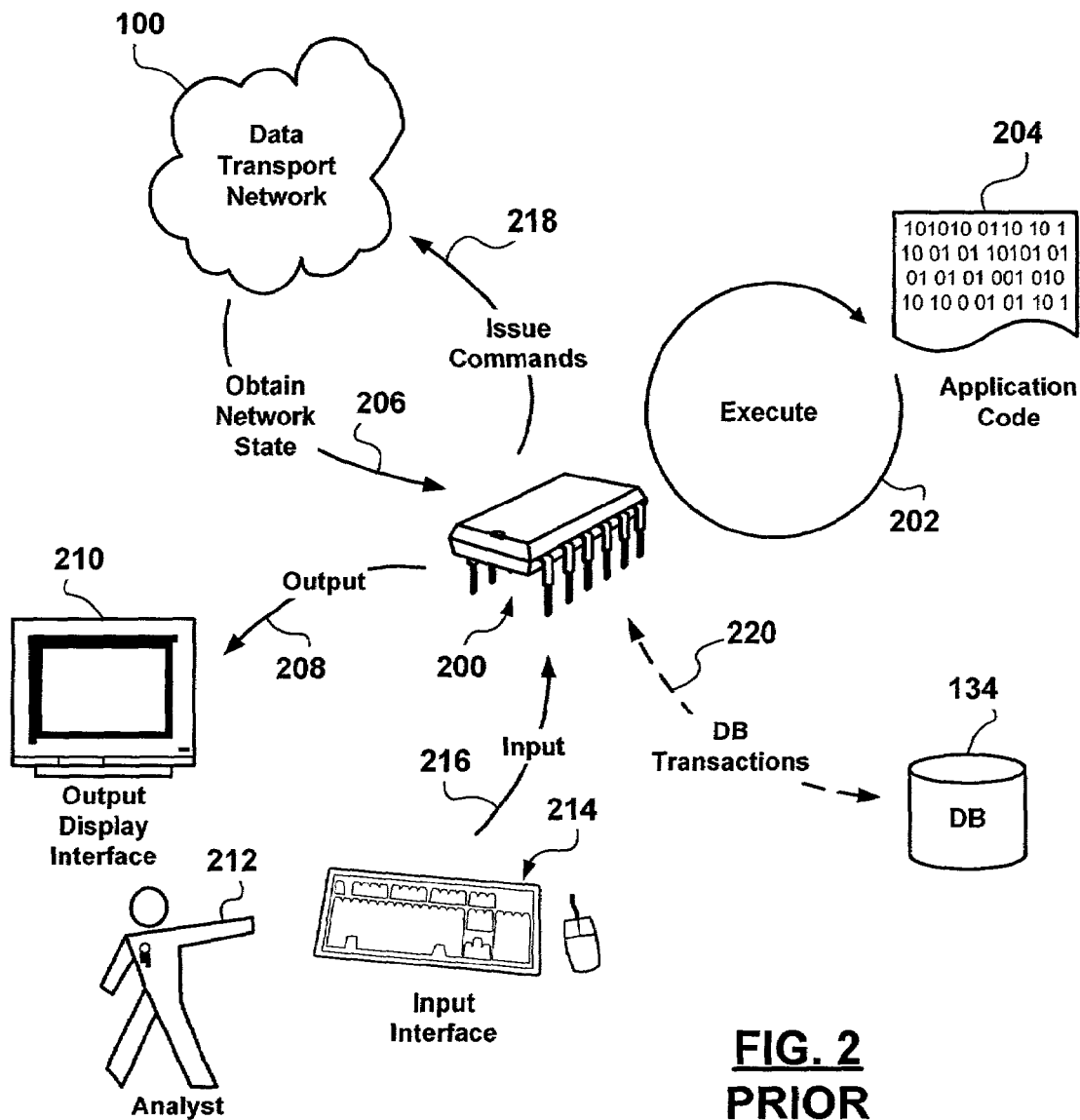
FIG. 2 is a schematic diagram of a computer executing application code in managing a data transport network and/or delivering data services.
Figure 3:
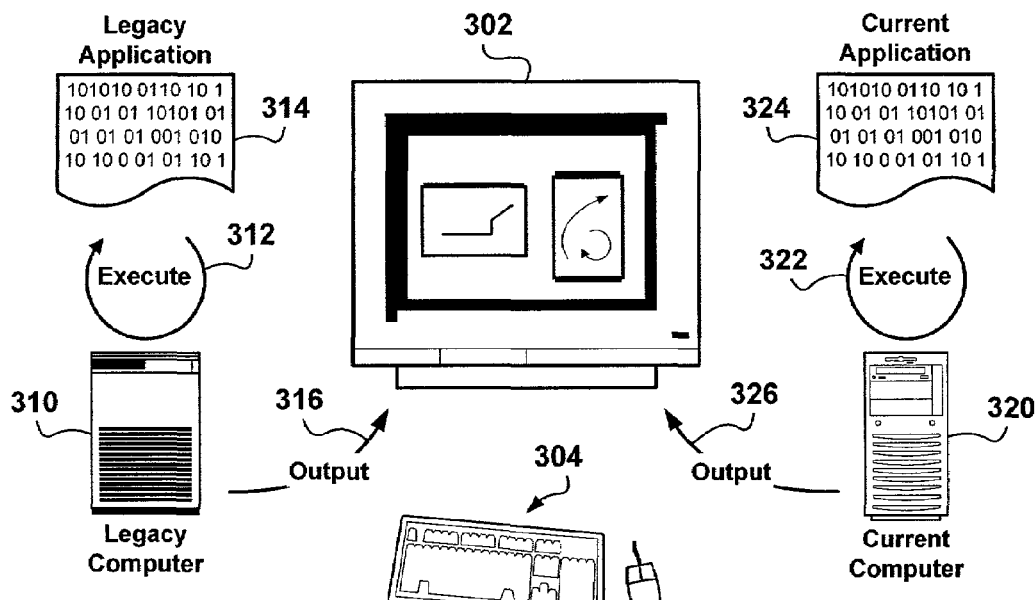
FIG. 3 is a schematic diagram showing details of a management and data service provisioning environment facilitating the presentation of a current data network state and providing an interaction therewith.
Figure 4:
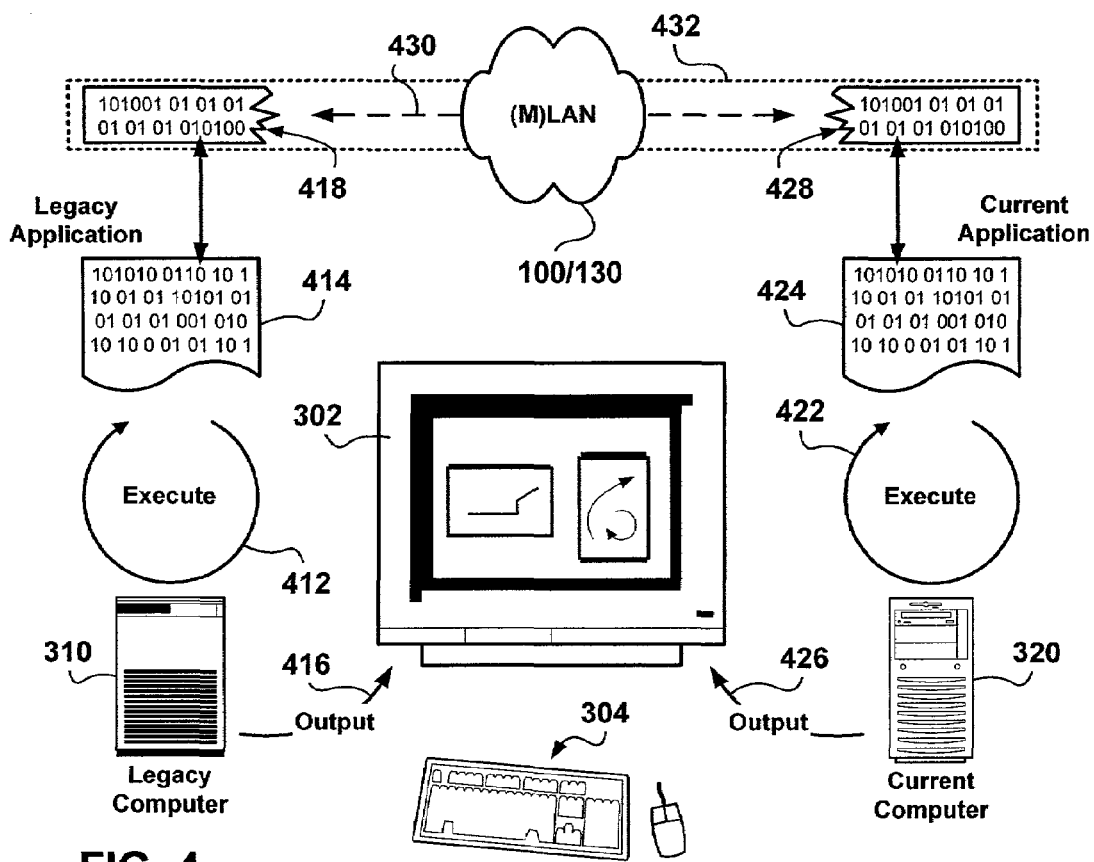
FIG. 4 is a schematic diagram showing, in accordance with a preferred embodiment of the invention, a detail of a network management and data service provisioning environment facilitating the presentation of a current data network state and providing an interaction therewith.

FIG. 4 is a schematic diagram showing, in accordance with a preferred embodiment of the invention, a detail of a network management and data service provisioning environment facilitating the presentation of a current data network state and providing an interaction therewith.

In accordance with a preferred embodiment, legacy software application code 414 is augmented with a code portion 418, as well current software application code 424 is augmented with a code portion 428. The application code change via the augmentation of at least one code portion (418/428) is performed only once per application to include provisions for information exchange 430 and support for limited application code load-up.

The one time augmentation of the existing (current and legacy) application code with code portions 418/428 removes the necessity of future re-coding thereof. In accordance with the invention, a process of development of new application code includes requirements for provisioning support of an interworking layer 432 to enable the information exchange 430 and also support for limited application load-up.

As would be appreciated by persons of skill in the art, the code portions 418 and 428 besides being shown to interact within the interworking environment, are also shown to be separate and distinct from application code 414 and 424 with which they interact.

The execution 412 of the legacy software application code 414 includes the execution of the code portion 418 and generates an output 416. The execution 422 of the current software application code 424 includes the execution of the code portion 428 and generates an output 426.

The code portions 418 and 428 make use of MLAN 130 resources to enable information exchange 430 thereby creating an interworking layer 432. The interworking layer 432 provides an interworking functionality between applications 414/424 used in combination to provide network management and service provisioning solutions.

Methods of information exchange include, but are not limited to: peer-to-peer information exchange, broadcast information exchange, client-server information exchange, etc. A network security server 570 and a command dispatch server 590 are shown in FIG. 5.

The methods of information exchange further include the exclusive or in-combination use of: encapsulation of information in exchanged messages, Remote Procedure Calling (RPC), Distributed Component Object Modeling (DCOM), Common Object Request Broker Architecture (CORBA), Java™'s Remote Method Invocation (RMI), etc. in creating a Distributed Computing Environment (DCE).

The analyst 212 interacts with the integrated environment via iconical elements (widgets) displayed on the display interface 302 through context specific point-and-click actions associated with the input interface 304. The invention is not limited to the mode of interaction mentioned above. Other interaction modes of interaction may be used exclusively or in-combination including the use of: special purpose key sequences entered via the input interface 304, a special purpose input interface 304 including a keyboard having action specific keys, a voice command interface (not shown), etc.

Figure 5:
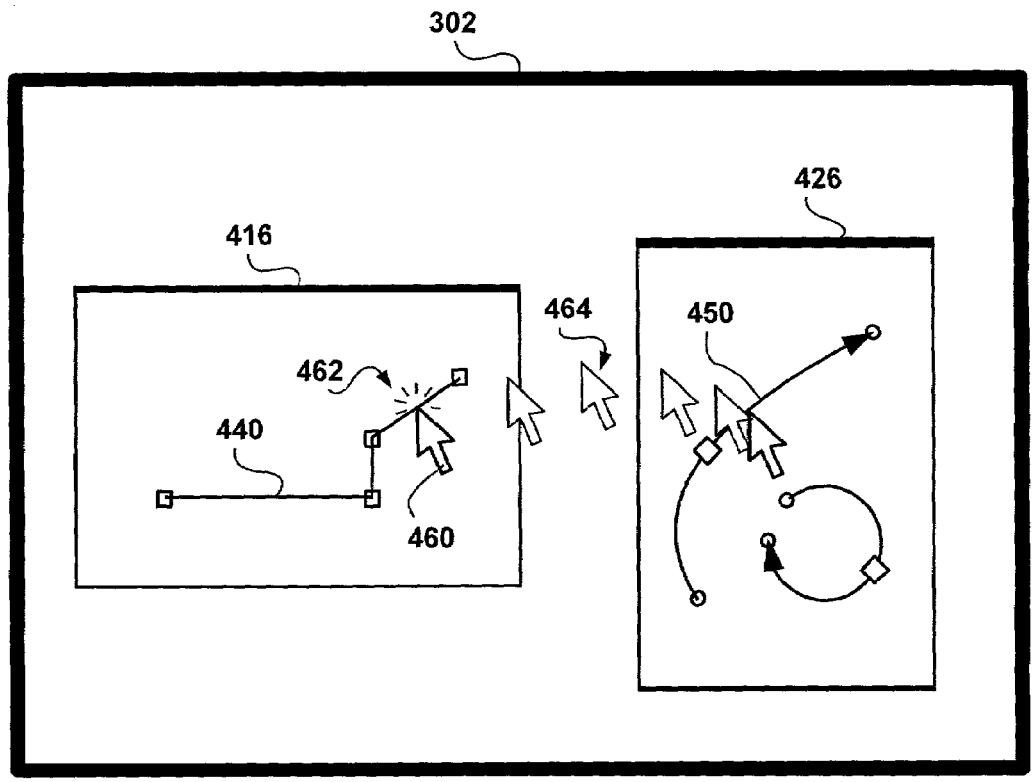
FIG. 5 is a schematic diagram showing a detail of the interaction with the integrated management and data service provisioning environment in accordance with a preferred embodiment of the invention.
Figure 5:
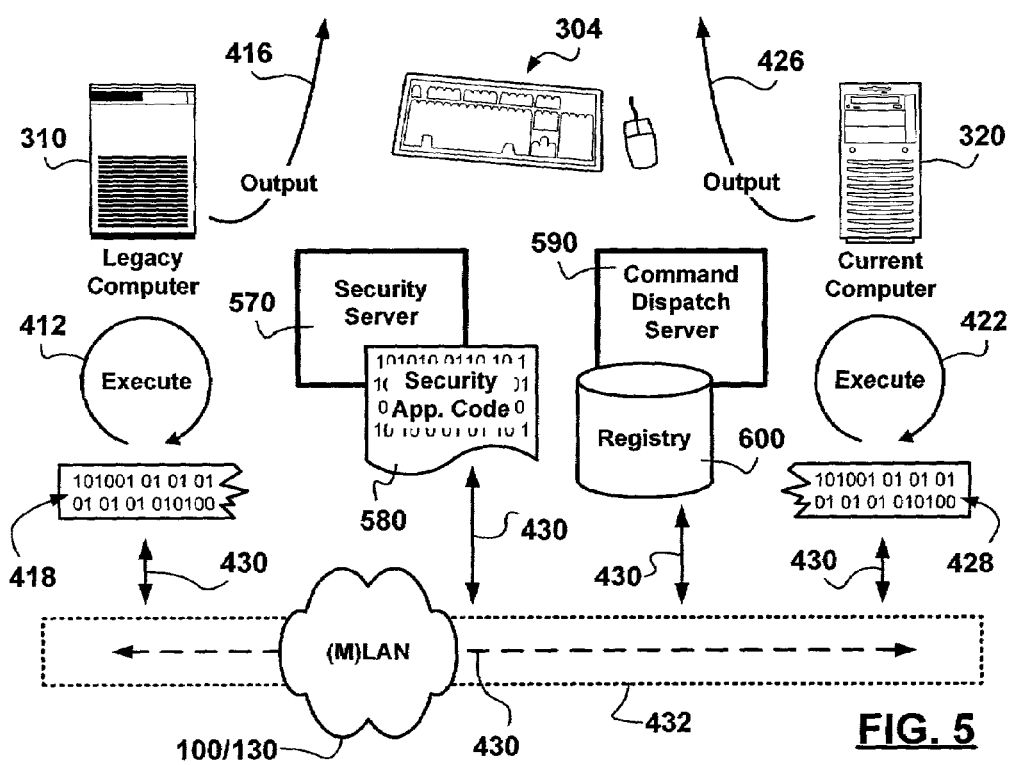

FIG. 5 is a schematic diagram showing, in accordance with an embodiment of the invention, a detail of the interaction with the integrated network management and data service provisioning environment.

Each data network entity, including but not limited to: node (switching node, aggregation node, deaggregation node, bridge, router, service provider node, service user node, etc.); component (shelf, interface card, port, etc.); device (database, server, firewall, etc.); data path; virtual circuit; virtual router; etc., bears a unique entity identifier (entityID).

In accordance with an exemplary operation: the legacy software application code 414 is a data network management application enabling the physical establishment of data paths such as data path 440 in the data transport network 100 and the current software application code 424 is a data service provisioning application enabling the establishment of data service connections 450 in the data transport network 100. A variety of iconical elements (widgets) are used to facilitate an efficient display of information to the analyst 212.

Using the pointing capabilities 460 of the input interface 304, the data path 440 is selected 462. Information is extracted, in executing 412 the code portion 418, including at least entityIDs of the data network nodes associated with the data path 440. The extracted information may also include parametric values associated with the selected data path 440. The extracted information is exchanged 430 with the code portion 428 of the current software application code 424. The execution 422 of the code portion 428 makes use of the provided entityIDs associated with the data path 440 and any other parametric values provided in establishing the data service connection 450. Making use of the parametric values provided may require applying a transformation to the parametric values such as, but not limited to: parameter unit transformation, time format conversion, etc.

The exchanged entityID information may either be self sufficient or may be used to derive further information about the data network nodes associated with the data path 440 necessary in establishing the data service connection 450. As would be apparent to a person of ordinary skill in the art, the derivation of the necessary information may include database 134 dips and/or query-response message exchanges with the data network nodes specified via the provided entityIDs, but is not limited thereto.

The entityID exchange between the code portions 418 and 428 may not be evident to the analyst 212. The analyst 212 subsequent to making the selection 462, for example, drags 464 the iconical representation of the data path 440 over to the window 426 to effect the setup of the data service connection 450.

The establishment of the data service connection 450 may or may not require auxiliary actions to be performed by the analyst 212 via the input interface 304 such as but not limited to: data throughput capacity entry, data transport jitter bounds, data transfer delay, etc.

Secure access is integrated across all computers participating in the network management and service provisioning environment, and provided via the interworking layer 430. The integration makes use of the security server 570. All analyst 212 actions are subject to a predefined scope of command and a span of control.

On interacting with the network management and service provisioning environment, the analyst 212 authenticates with the security server 570 and the analyst 212 is subsequently authorized to perform a specific set of actions defining the scope of command—the actions being allowed on specific data network entities at specific times under a specific set of conditions defining the span of control.

In accordance with an embodiment of the invention, a record of applications and capabilities associated therewith is kept for the hub 132.

Figure 6:
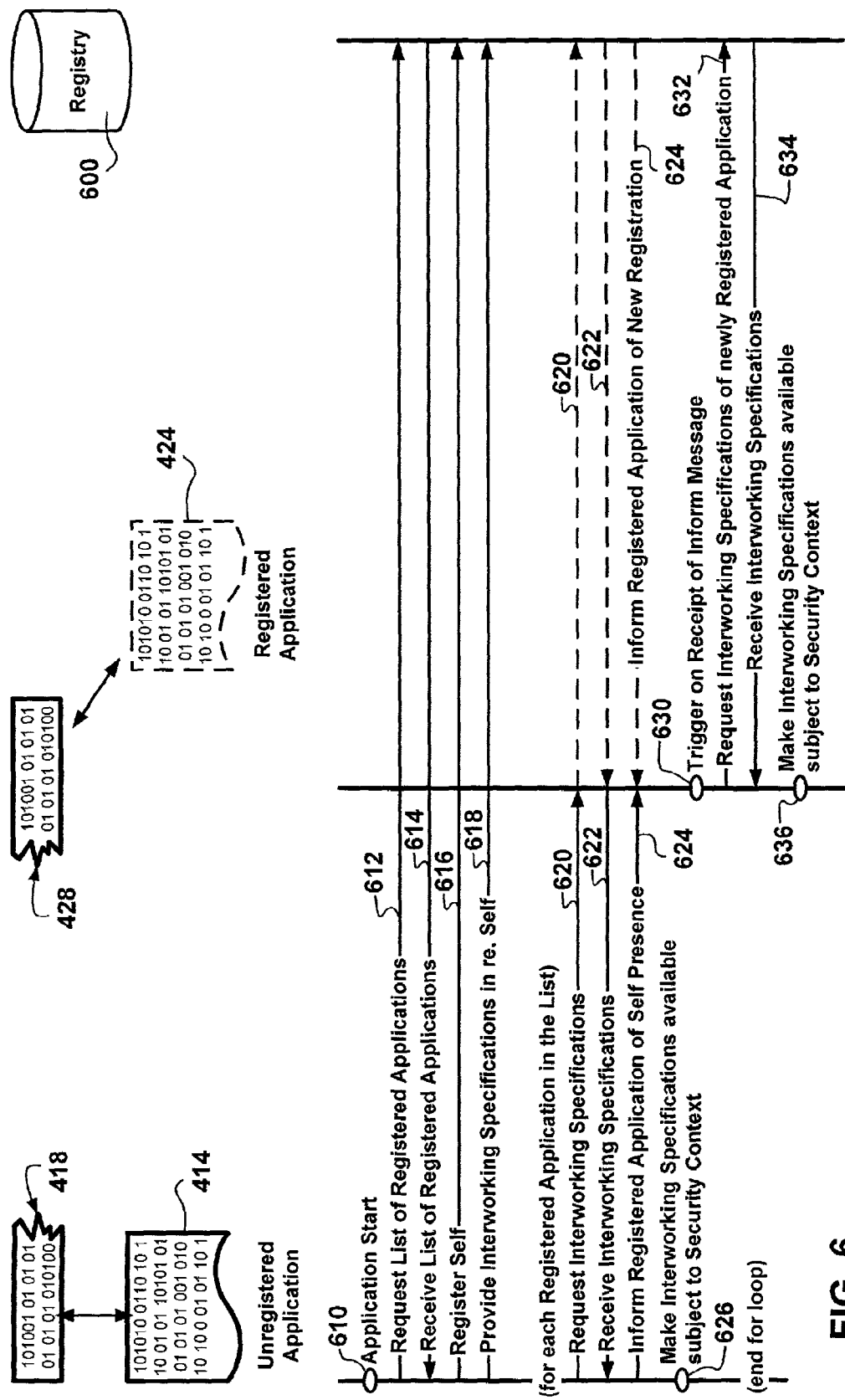
FIG. 6 is a schematic diagram showing exchanged messages in enabling the interworking layer for provisioning the network management and service provisioning solution in accordance with an exemplary embodiment of the invention.

FIG. 6 is a schematic diagram showing, in accordance with an exemplary embodiment of the invention, exchanged messages in enabling the interworking layer 432.

In accordance with the exemplary embodiment of the invention, a registry 600 is used to keep record of applications participating in the network management and service provisioning environment. The registry 600 may also keep record of available capabilities provided via the participating applications.

Making reference to an exemplary scenario, the legacy application 414 is loaded for execution and is yet unregistered with the registry 600, while the current application 424 is not loaded for execution although being registered with the registry 600. The separation and interaction between the code portion 428 and the application code 424 enables the registration of current application 424 by loading and executing only the code portion 428. The selective registration of components such as application code 414 enables a plug-and-play provisioning of the network management and service provisioning solution. The registration of the applications 414/424 by loading and executing only the code portions 418/428 enables limited load-up provisioning of the network management and service provisioning solution in support of an efficient use of resources.

In registering the application 414 with the registry 600, as the analyst 212 runs the unregistered application 414 in step 610, the application 414, via the application code portion 418, requests 612 from the registry 600 a list of registered applications. In step 614, the application 414 receives the list of registered applications including application 424. Subsequent to the receipt 614 of the list of registered applications from the registry 600, the application 414 registers itself, in step 616, and may provide a group of interworking specifications detailing capabilities of the application 414.

The application 414 requests, in step 620, corresponding interworking specifications for each registered application in the received list, including the application 424. The interworking specifications are received in step 622.

In using the application 414, the capabilities detailed in the received interworking specifications are made available (626) for invocation, subject to a security context. For example, a tool bar associated with the software application 414 is updated to provide selections corresponding to the received capabilities.

In accordance with the example, each registered application, such as the application 424 and more specifically the loaded application code portion 428 proxy thereof, is informed 624 of the invocation of the application 414. The informing step 624 triggers the application 424 and more specifically its loaded code portion 428, in step 630, to request (632) interworking specifications of the application 414 from the registry 600. The interworking specifications are received in step 634. The capabilities of the application 414 can be made available for invocation in interacting with the application 424 in step 636.

In accordance with the invention, the above presented sequence of events and the registry 600 enable the participating applications 414/242 to act as a plug-in applications to the network management and service provisioning environment. The separation and interaction between the applications 414/424 and the respective application code portions 418/428, provide a limited load-up and execution of application code at reduced resource utilization.

The registry 600 may be implemented in numerous ways without departing from the spirit of the invention. For example, the registry 600 may be implemented as a persistence entity including: a data structure, a simple file, a registration server, etc.

The registry 600 implemented as a data structure would be associated with one of the participating software applications participating in the integrated network management and service provisioning environment.

The registry 600 implemented as a registration server may inform (624) all registered applications (424) of the newly registered application 414. The registry 600 may hold only registered applications specifications while the interworking specifications are to be exchanged directly between registered applications themselves. The sequence of exchanged messages may be changed.

Having registered with the registry 600, information exchange in the interworking environment may require, subject to a security context, the performance of an action provided by the yet to be loaded registered application 424. The interworking environment provides the means for information exchange between the application code portions 418 and 428.

Figure 7:
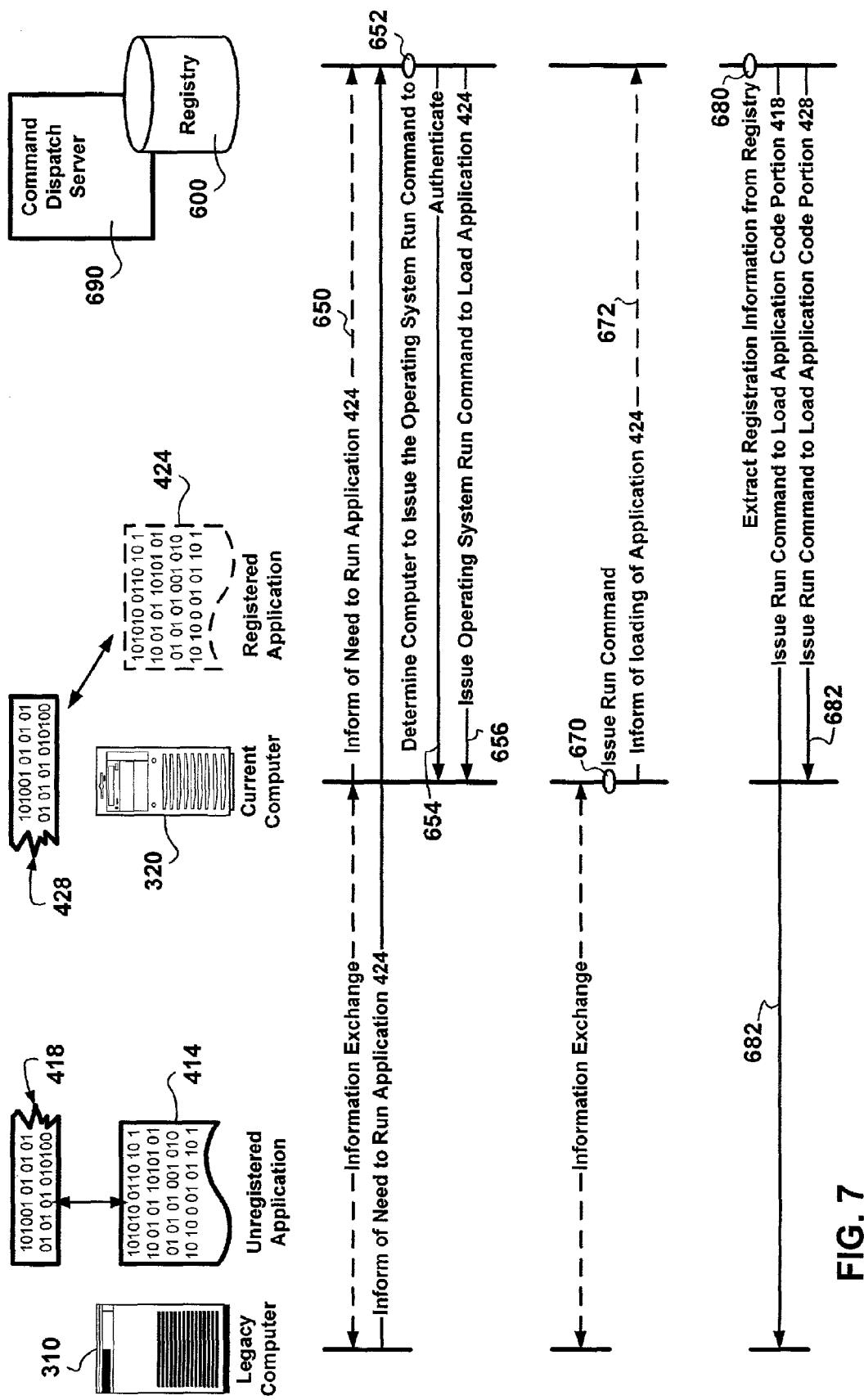
FIG. 7 is a schematic diagram showing exchanged messages in enabling a reduction of resource utilization in provisioning the network management and service provisioning solution in accordance with an exemplary embodiment of the invention.

In accordance with an exemplary implementation shown in FIG. 7, the load-up of the registered application 424 may be caused by informing 650 the command dispatch server 690 of the need to load and run the application 424. The informing step 650 may be initiated by the application code portion 414 or the application code portion 424. The command dispatch server 690 makes a determination 652 as to which computer in the hub 132 to issue the operating system run command to. The determination may be based on registration information associated with the corresponding application code portion 428 but is not limited thereto. In issuing the operating system run command, the command dispatch server 690 authenticates 654 with the computer 320 perhaps using the analyst's 212 userID and password. The command dispatch server 690 issues 656 an operating system run command to load the registered application 424. The issued 656 run command has a syntax specific for the determined computer and its operating system.

In accordance with another exemplary implementation, the loading up of the registered application 424 may be triggered by the exchange of information 660 with the application code portion 428. The application code portion 428 issues an execute command 670 to load the registered application 424. Enforcing the security context for the analyst may be provided via the interworking layer. The registry 600 may also be informed 672 of the running state of the registered application 424.

In accordance with an exemplary scenario, an analyst 212 may chose to interact with a legacy computer 310 having a human-machine interface. At the same time, the legacy computer 310 may be executing a legacy application 414 specifically designed for the legacy computer 310 perhaps utilizing the resources of the legacy computer 310 to a high degree. By loading and activating only the necessary components, the analyst 212 can have access to and interact with the integrated network management and service provisioning environment claiming only a limited amount of resources from the legacy computer 310.

In accordance with the invention, a facility is provided for the unloading of application code 414/424 when not in use for prolonged periods of time to reduce utilization of resources without sacrificing functionality. Such facility may be subject to caching policies.

In accordance with another embodiment of the invention, the registry 600 and command dispatch server 690 may further be used in combination in provisioning the network management and service provisioning environment. The registry 600 may be designed to persistently store the registration information. On start-up the command dispatch server 690 interacts 680 with the registry 600 to extract application registration information therefrom. The extracted application registration information is used to load-up for execution application code portions 418/428 corresponding to registered applications 414/424. Operating system run commands 682 are issued to respective computers 310/320 to load-up and execute the application code portions 418/428.

The load-up for execution of the application code portions 418/428 enables limited plugin load-up operation. Only required applications 414/424 of the network management and service provisioning solution are loaded up and executed. The rest of the registered applications are loaded up and executed on a need-to-use basis resulting in an improved overall performance and scalable network management and service provisioning solutions.

The advantages provided by such an arrangement are derived from a minimum utilization of resources while providing full access (subject to a security context) to all capabilities provided by the network management and service provisioning solution.

Figure 8:
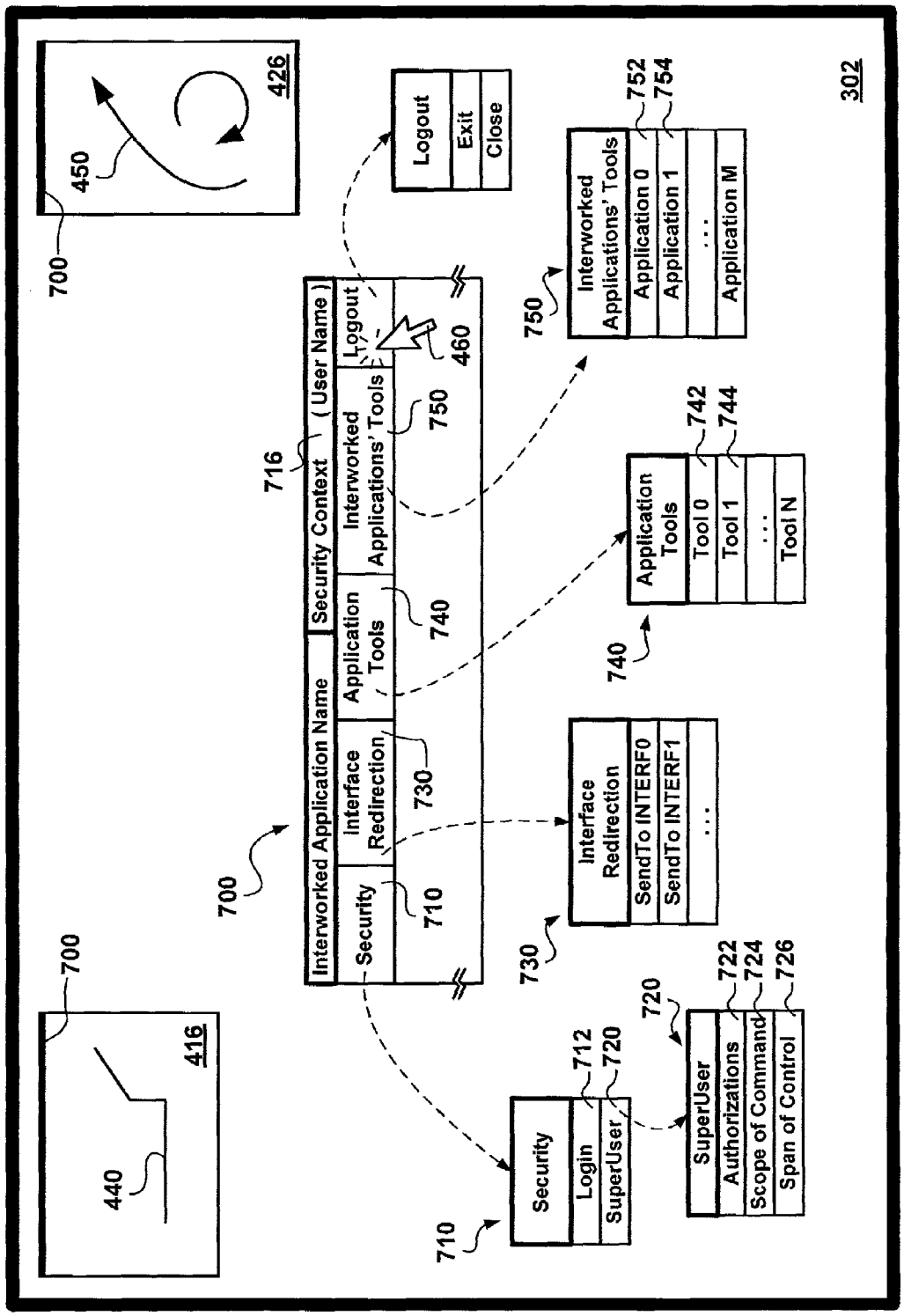
FIG. 8 is a schematic diagram showing another detail of the interaction with the integrated network management and data service provisioning environment in accordance with another embodiment of the invention.

FIG. 8 is a schematic diagram showing another detail of the interaction with the network management and service provisioning environment.

An exemplary implementation of a mode of interaction with the integrated environment is show to include an application toolbar 700 including a group of selection menus. The implementation is not limited to the use of menus—other iconical elements (widgets) such as: pop-up menus, buttons, sliders, check boxes, etc. may be used to provide an intuitive interface. The process presented above in FIG. 6 synchronizes all toolbar menus 700 for each application 414/424.

To facilitate the integrated environment, the application toolbar 700 is provided with a security menu 710. The security menu 710, when selected, provides access to login facilities 712. As application code 414/424 is run on different computers 310/320 the analyst 212 is required to authenticate with the integrated environment. The analyst authentication may be provided either exclusively or in-combination via security server 570 and/or security application 580. The analyst is authenticated with each application 414/424 and/or computer 310/320 either by default or on a need-to-access basis as the analyst 212 accesses capabilities provided by applications 141/424 running thereon.

The application toolbar 700 may include a security context field, such as shown at 716, specifying the analyst 212 whose scope of command and span of control is used in interacting with the integrated environment.

Other application toolbar 700 selections include logout facilities via which the analyst may either exit the application whose toolbar menu 700 is actively used or to close all the applications 414/424 actively used by the analyst 212. Closing all loaded applications 414/424 may be limited to unloading the applications 414/424 while still executing the application code portions 418/428 in support of the integrated environment.

Another security menu 710 selection includes a superuser selection 720. The superuser selection 720 requires a higher level authentication perhaps via additional userID and password. The superuser selection 720 provides security context management.

Another application toolbar 700 selection includes an interface redirection selection 730 to enable the redirection of the output of applications to other display interfaces 302. The display interfaces 302 include physical displays associated with workstations 142/152, terminal 144, the advanced interface 154, etc.

A further application toolbar selection 740 provides access to capabilities provided via the application 414/424 actively interacted with. The selections 742/744 available are security context sensitive. When the analyst 212 selects a capability 724/744 for which the analyst 212 does not have the necessary authorization, access violation flags can be raised and access violation messages can be generated.

Yet another application toolbar selection 750 provides access to capabilities provided via applications (414/424) 752/754 registered with the interworking layer 432 perhaps, but not necessarily, running on different computers 310/320. The selections available are security context sensitive.

Figure 9:
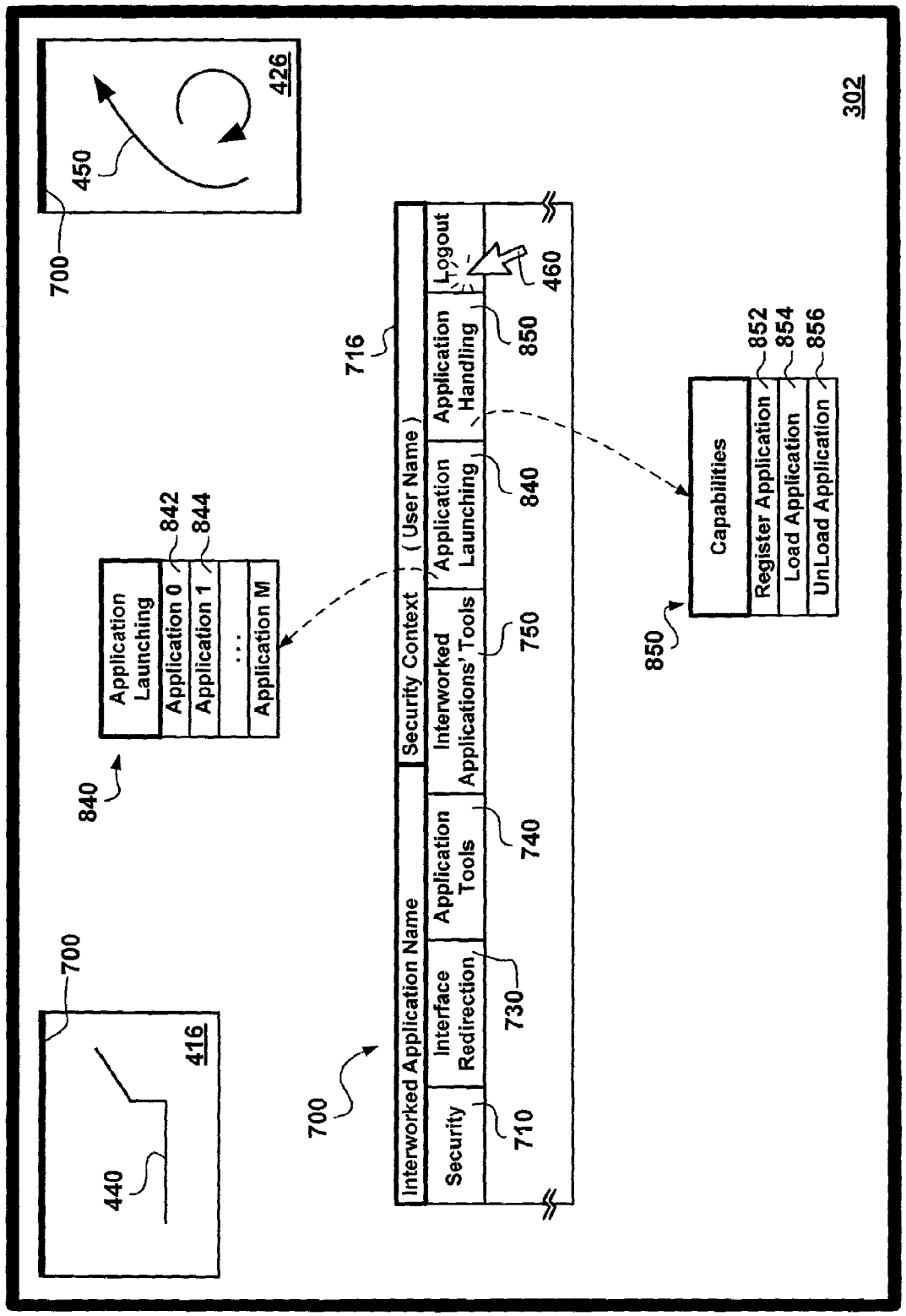
FIG. 9 is a schematic diagram showing yet another detail of the interaction with the integrated network management and service provisioning environment in accordance to yet another embodiment of the invention.

FIG. 9 is a schematic diagram showing, in accordance to yet another embodiment of the invention, another detail of the interaction with the integrated network management and service provisioning environment.

The analyst 212 is provided with a tool bar selection 840 for application launching. Via a submenu, the analyst 212 may be informed of applications 414/424 registered with the registry 600. Menu selections 842 and 844 are subject to the analyst's security context and the menu selections 842/844 may provide indications as to whether the corresponding applications are loaded. The launching of applications may employ the command dispatch server 690 via the interworked environment as described above with reference to FIG. 6 and FIG. 7. When the analyst 212 selects and launches an application where the analyst 212 does not have the necessary authorization thereto, access violation flags can be raised and access violation messages can be generated.

Applications 414/424 may be run on a group of computers, the application launching selections 842/844 may necessitate further computer selection steps to dispatch system level commands to.

The analyst 212 is further provided with a tool bar selection 850. A submenu associated with the tool bar selection 850 provides access to application handling such as, application registration 852, application loading 854, and application unloading 856. Menu selections 852, 854, 856 are subject to the analyst's security context and ensuing actions may employ the command dispatch server 690 via the interworked layer 432 as described above.

An optimization of the use of applications 414/424 participating in the interworking layer 430 is derived from the flexibility in accessing capabilities and exchanging information.

In accordance with another method of interacting with the interworking layer 430, a group of analysts 212 interact with different applications 414/424 participating in the network management and service provisioning environment enabled via the interworking layer 430. The methods presented herein provide for a consistent interface presented to each analyst 212 while the actions of each analyst 212 are subject to an individual scope of command and an individual span of control. The loading of an application 414/424 may be initiated at the request of a single analyst 212 while the unloading of an application is subject to non-use by all analysts 212 in the group.

In accordance with yet another implementation, the integrated network management and service provisioning environment is said to be provisioned at the hub 132 via: computers 310/320, applications 414/424, display interfaces 144/154/302, input interfaces 304, enabling elements 134, analysts 212, etc. all which being: registered, loaded, unloaded, activated, deactivated, etc. with the integrated environment.

The embodiments presented are exemplary only and persons skilled in the art would appreciate that variations to the above described embodiments may be made without departing from the spirit of the invention. The scope of the invention is solely defined by the appended claims.

I claim:

1. A network management and service provisioning hub provisioning a network management and service provisioning environment, the hub comprising:
    at least two interconnected computers, each computer including local persistent storage for storing at least one of a plurality of software application components of a network management and service provisioning solution and a software application code portion corresponding to each software application component; each software application code portion being loaded for execution during the startup of the corresponding computer, the software application code portion advertising features and functionality of the corresponding software application component within the network management and service provisioning environment;
    each software application component being selectively loadable for execution separate from, and on the same computer as, the corresponding software application code portion,
    the separate loading of said software application component from the corresponding application code portion providing a reduction in resource utilization in provisioning the network management and service provisioning solution.

2. A network management and service provisioning hub as claimed in claim 1, further comprising a registry for exchanging information with, and between, the at least two software application code portions, the registry holding a list of software application components registered to participate in the network management and service provisioning solution, and further holding associations between registered software application components and corresponding computers on which the software application components are stored and executable.

3. A network management and service provisioning hub as claimed in claim 2, wherein the registry further holds a specification for each software application component specifying whether said software application component is loaded for execution on the corresponding computer.

4. A network management and service provisioning hub as claimed in claim 2, wherein the registry comprises a persistent storage.

5. A network management and service provisioning hub as claimed in claim 1, further comprising a command dispatch server selectively issuing at least one operating system level run command to load for execution one of the software application components on the computer corresponding thereto, in response to a need for advertised functionality thereof, the selective loading of the software application component for execution reducing resource utilization in provisioning the network management and service provisioning solution.

6. A network management and service provisioning hub as claimed in claim 1, wherein network management and service provisioning is effected in a data transport network having data network entities, each data network entity having an associated entityID, the software application code portions further being configured to cause the extraction of entityID information from corresponding software application components and configured to cause the exchange of entityID information between the software application code portions in enabling the information exchange between corresponding software application components.

7. A network management and service provisioning hub as claimed in claim 1, further comprising a security access server enabling an analyst to interact with the network management and service provisioning solution subject to at least one of a scope-of-command and span-of-control.

8. A network management and service provisioning hub as claimed in claim 1, further comprising a secure access software application component participating in the integrated network management and service provisioning solution, the secure access application enabling an analyst to interact with the network management and service provisioning solution subject to at least one of a scope-of-command and span-of-control.

9. A method of provisioning a network management and service provisioning environment at a network management and service provisioning hub, the method comprising:
   a. loading for execution at least two software application code portions on corresponding computers, each software application code portion corresponding to a software application component of a network management and service provisioning solution, the software application component being stored, and executable, on the corresponding computer;
   b. each software application code portion advertising features and functionality of the corresponding software application component within the network management and service provisioning environment;
   c. determining a need for functionality provided by one of the stored software application components; and
   d. selectively loading said software application component for execution separately from the corresponding software application code portion on the same computer as the corresponding software application code portion according to the determined need, the selective loading of software application components reducing resource utilization in provisioning the network management and service provisioning solution.

10. A method as claimed in claim 9, wherein loading the software application component for execution on the corresponding computer, the method further comprises: issuing a run command from a command dispatch server to the computer storing the software application component.

11. A method as claimed in claim 10, wherein loading said software application component for execution on the corresponding computer further comprises: issuing an operating system level run command from the command dispatch server to the computer storing the software application component.

12. A method as claimed in claim 10, wherein determining the need for functionality the method further comprising: consulting a registry holding registration information characterizing the software application component as a participant in the network management and service provisioning environment.

13. A method as claimed in claim 1, wherein loading said software application component for execution on the corresponding computer further comprises: determining the operating system level run command to effect the loading of said software application component for execution on the computer storing the software application component.

14. A method as claimed in claim 9, the method further comprising: issuing a run command from the command dispatch server to the software application code portion to effect the loading of said software application component for execution.

15. A method as claimed in claim 14, wherein loading said software application component for execution further comprises: issuing an operating system level run command from the software application code portion to effect the loading said software application component for execution.

16. A method as claimed in claim 9, the method further comprising: determining that the functionality provided by a loaded software application component is no longer needed.

17. A method as claimed in claim 16, wherein the step of determining that the functionality provided by the loaded software application component is no longer needed, the method further comprises a step of: enforcing caching policies employed by a computer executing the software application component.

18. A method as claimed in claim 16, the method further comprising a step of: unloading the no longer needed software application component reducing resource utilization in provisioning the network management and service provisioning environment.

19. A method as claimed in claim 9, wherein determining the need for functionality further comprising: exchanging information between each software application code portion and a registry holding registration information characterizing software application components as participants in the network management and service provisioning environment.

20. A method as claimed in claim 9, wherein said software application code portions define an interworking layer and determining the need for corresponding software application component functionality further comprises: exchanging information between said software application code portions.

* * * * *

UNITED STATES PATENT AND TRADEMARK OFFICE
CERTIFICATE OF CORRECTION

| | |
|---|---|
| PATENT NO. | : 7,650,398 B2 |
| APPLICATION NO. | : 10/156228 |
| DATED | : January 19, 2010 |
| INVENTOR(S) | : Satvinder Singh Bawa |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1993 days.

Signed and Sealed this

Twenty-eighth Day of December, 2010

David J. Kappos
*Director of the United States Patent and Trademark Office*